(12) United States Patent
Uemura et al.

(10) Patent No.: US 10,814,677 B2
(45) Date of Patent: Oct. 27, 2020

(54) PNEUMATIC TIRE

(71) Applicant: The Yokohama Rubber Co., LTD., Minato-ku, Tokyo (JP)

(72) Inventors: Takanori Uemura, Hiratsuka (JP); Hiraku Kouda, Hiratsuka (JP); Tatsuro Shinzawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/077,726

(22) PCT Filed: Feb. 14, 2017

(86) PCT No.: PCT/JP2017/005358
§ 371 (c)(1),
(2) Date: Aug. 13, 2018

(87) PCT Pub. No.: WO2017/141913
PCT Pub. Date: Aug. 24, 2017

(65) Prior Publication Data
US 2019/0359006 A1   Nov. 28, 2019

(30) Foreign Application Priority Data

Feb. 15, 2016 (JP) .................................. 2016-025846

(51) Int. Cl.
*B60C 11/12* (2006.01)
*B60C 11/13* (2006.01)

(52) U.S. Cl.
CPC ...... *B60C 11/1281* (2013.01); *B60C 11/1204* (2013.01); *B60C 11/125* (2013.01);
(Continued)

(58) Field of Classification Search
CPC ............... B60C 11/1204; B60C 11/125; B60C 11/1281; B60C 11/1392; B60C 2011/1209
See application file for complete search history.

(56) References Cited

U.S. PATENT DOCUMENTS

| 2005/0211355 A1* | 9/2005 | Metz .................. B60C 11/0309 152/209.24 |
| 2010/0084062 A1* | 4/2010 | Miyazaki ................ B60C 11/12 152/209.18 |
| 2013/0186532 A1* | 7/2013 | Kujime ............... B60C 11/0304 152/209.8 |

(Continued)

FOREIGN PATENT DOCUMENTS

DE  10 2012 109 712    4/2014
EP        213452 A2 *  3/1987
(Continued)

OTHER PUBLICATIONS

Machine translation for Japan 2007-112218 (Year: 2019).*
(Continued)

*Primary Examiner* — Steven D Maki
(74) *Attorney, Agent, or Firm* — Thorpe North & Western

(57) ABSTRACT

A sipe of a pneumatic tire includes an edge on a leading side and an edge on a trailing side, chamfered portions shorter than a sipe length of the sipe formed on respective leading and trailing side edges, and non-chamfered regions on which no other chamfered portion exists on portions opposing respective chamfered portions in the sipe. One end portion of the sipe opens into a main groove and another end portion terminates within a rib. A maximum depth x (mm) of the sipe and a maximum depth y (mm) of the chamfered portion satisfy $x \times 0.1 \leq y \leq x \times 0.3 + 1.0$. A sipe width of the sipe is constant in a range from a sipe portion positioned inside in a tire radial direction of the chamfered portion to a groove bottom of the sipe.

12 Claims, 8 Drawing Sheets

(52) U.S. Cl.
CPC ...... *B60C 11/1236* (2013.01); *B60C 11/1259* (2013.01); *B60C 11/1392* (2013.01); *B60C 2011/1209* (2013.01); *B60C 2011/1213* (2013.01)

(56) References Cited

U.S. PATENT DOCUMENTS

| | | | |
|---|---|---|---|
| 2013/0206298 A1 | 8/2013 | Guillermou et al. | |
| 2015/0210121 A1* | 7/2015 | Sanae | B60C 11/0304 152/209.8 |
| 2016/0152090 A1* | 6/2016 | Takemoto | B60C 11/0306 152/209.24 |
| 2016/0297254 A1* | 10/2016 | Numata | B60C 11/0332 |
| 2018/0015788 A1* | 1/2018 | Hayashi | B60C 11/03 |

FOREIGN PATENT DOCUMENTS

| | | | |
|---|---|---|---|
| EP | 3418075 A1 | * | 12/2018 |
| JP | 03-167008 A | * | 7/1991 |
| JP | 2005-075213 A | * | 3/2005 |
| JP | 2007-112218 A | * | 5/2007 |
| JP | 2013-035345 | | 2/2013 |
| JP | 2013-537134 | | 9/2013 |
| JP | 2015-047977 | | 3/2015 |
| JP | 2015-140047 | | 8/2015 |
| JP | 2015-231812 | | 12/2015 |
| JP | 2016-088165 | | 5/2016 |
| WO | WO 2012/032144 | | 3/2012 |
| WO | WO 2014/056651 | | 4/2014 |
| WO | WO 2015/083474 | | 6/2015 |
| WO | WO-2017/141651 A1 | * | 8/2017 |

OTHER PUBLICATIONS

Machine translation for Japan 2005-075213 (Year: 2019).*
Machine translation for Japan 03-167008 (Year: 2019).*
Machine translation for Europe 213452 (Year: 2019).*
International Search Report for International Application No. PCT/JP2017/005358 dated Apr. 4, 2017, 4 pages, Japan.

* cited by examiner

PNEUMATIC TIRE

TECHNICAL FIELD

The present technology relates to a pneumatic tire, more specifically relates to a pneumatic tire capable of providing good improvement of steering stability performance on dry road surfaces and improvement of steering stability performance on wet road surfaces in a compatible manner, and additionally capable of enhancing noise performance by devising a chamfer shape of a sipe.

BACKGROUND ART

In the related art, a plurality of sipes is formed on a rib defined by a plurality of main grooves in a tread pattern of a pneumatic tire. By forming these sipes, drainage properties are ensured, and the steering stability performance on wet road surfaces is delivered. However, when many sipes are disposed in a tread portion for enhancing the steering stability performance on wet road surfaces, there are disadvantages in which the steering stability performance on dry road surfaces and uneven wear resistance performance decrease due to lowering of rigidity of a rib. Additionally, when many sipes are disposed in the tread portion, popping sounds and pattern noise during driving are radiated outside a vehicle, and noise from the tire tends to increase. Thus, it is difficult to achieve good noise performance (noise reduction) and the steering stability performance on wet road surfaces in a compatible manner.

On the other hand, various kinds of pneumatic tires in which sipes are formed in a tread pattern, and chamfered are proposed (for example, see Japan Patent Publication No. 2013-537134). When sipes are formed and chamfered, an edge effect may be lost depending on a chamfer shape, and the steering stability performance on dry road surfaces or the steering stability performance on wet road surfaces may be insufficiently improved depending on a chamfer dimension.

SUMMARY

The present technology provides a pneumatic tire capable of providing good improvement of steering stability performance on dry road surfaces and improvement of steering stability performance on wet road surfaces in a compatible manner, and additionally capable of enhancing noise performance by devising a chamfer shape of a sipe.

A pneumatic tire of the present technology includes a plurality of main grooves extending in a tire circumferential direction in a tread portion including a sipe extending in a tire lateral direction on a rib defined by the main grooves, in which the sipe includes an edge on a leading side and an edge on a trailing side, chamfered portions shorter than a sipe length of the sipe are formed on the respective edges on the leading side and on the trailing side, one end portion of both end portions of the sipe opens into the main groove and another end portion terminates within the rib, non-chamfered regions on which no other chamfered portion exists exist on portions opposing to respective chamfered portions in the sipe, a maximum depth x (mm) of the sipe and a maximum depth y (mm) of the chamfered portion satisfy a relationship of the following Formula (1), and a sipe width of the sipe is constant in a range from an end portion positioned inside in a tire radial direction of the chamfered portion to a groove bottom of the sipe;

$$x \times 0.1 \leq y \leq x \times 0.3 + 1.0 \quad (1).$$

In the present technology, in a pneumatic tire including a sipe extending in a tire lateral direction on a rib defined by main grooves, by providing respective chamfered portions shorter than a sipe length of a sipe on edges on a leading side and on a trailing side of the sipe, whereas providing non-chamfered regions on which no other chamfered portion exists on respective portions opposing to chamfered portions in the sipe, it is possible to enhance a drainage effect based on the chamfered portion, and at the same time, to effectively remove a water film on the non-chamfered region by an edge effect. Accordingly, it is possible to improve steering stability performance on wet road surfaces significantly. Additionally, since the chamfered portion and the non-chamfered region are provided on the respective edges on the leading side and on the trailing side in a mixed manner, it is possible to maximally enjoy an effect of enhancing the above-described wet performance during braking and driving. In addition, an area to be chamfered may be minimized in comparison with a sipe chamfered as in the related art, thus it is possible to improve steering stability performance on dry road surfaces. As a result, it is possible to provide good improvement of the steering stability performance on wet road surfaces and improvement of the steering stability performance on dry road surfaces in a compatible manner. Additionally, since one end portion of both end portions of the sipe opens into the main groove and the other end portion terminates within the rib, reduction effect for noise generated during driving is exhibited, and it is possible to provide good improvement of the steering stability performance on dry road surfaces and improvement of the steering stability performance on wet road surfaces in a compatible manner at the same time.

In the present technology, the chamfered portion preferably projects from the other end portion of the sipe and extends in a length direction of the sipe. Disposing the chamfered portion as described above makes it possible to provide good improvement of rigidity of a block and enhancement of drainage properties in a compatible manner.

In the present technology, the pneumatic tire has a designated mounting direction with respect to a vehicle, and the sipe preferably opens toward a vehicle inner side. Accordingly, it is possible to reduce sound radiated toward outside the vehicle, and as a result, improve noise performance.

In the present technology, a sipe length of the sipe is preferably from 0.2 to 0.9 times a rib width of the rib. As described above, since the sipe length of the sipe is set to an appropriate length, it is possible to improve the noise performance and provide good improvement of the steering stability performance on dry road surfaces and improvement of the steering stability performance on wet road surfaces in a compatible manner. More preferably, the length is from 0.3 to 0.8 times the width.

In the present technology, preferably, the sipe is inclined with respect to the tire circumferential direction. As described above, by making the sipe inclined, it is possible to improve pattern rigidity and further improve the steering stability performance on dry road surfaces.

In the present technology, an inclination angle on an acute angle side with respect to the tire circumferential direction of the sipe is preferably from 40° to 80°. As described above, by setting the inclination angle on the acute angle side with respect to the tire circumferential direction of the sipe, it is possible to improve the steering stability performance on dry road surfaces more effectively. More preferably, the angle is from 50° to 70°.

In the present technology, the chamfered portion is preferably disposed on the acute angle side of the sipe. In this way, it is possible to further enhance uneven wear resistance performance. Alternatively, the chamfered portion is preferably disposed on an obtuse angle side of the sipe. Accordingly, the edge effect increases, thereby making it possible to further improve the steering stability performance on wet road surfaces.

In the present technology, at least part of the sipe preferably curves or bends in a plan view. By forming at least part of the sipe as described above, a total amount of the edge of each of the sipes increases, thereby making it possible to improve the steering stability performance on wet road surfaces. The whole sipe may be an arc.

In the present technology, the chamfered portion preferably opens into the main groove. Accordingly, it is possible to further improve the steering stability performance on wet road surfaces. Alternatively, the chamfered portion preferably terminates within the rib. Accordingly, it is possible to further improve the steering stability performance on dry road surfaces.

In the present technology, an overlap length of the chamfered portion formed on the edge on the leading side of the sipe and the chamfered portion formed on the edge on the trailing side of the sipe is preferably from −30% to 30% of the sipe length. As described above, by appropriately setting the overlap length of the chamfered portion with respect to the sipe length, it is possible to provide good improvement of the steering stability performance on dry road surfaces and improvement of the steering stability performance on wet road surfaces in a compatible manner. More preferably, the overlap length is from −15% to 15% of the total sipe length.

In the present technology, the chamfered portion is preferably disposed on a position of the edge on the leading side and on a position of the edge on the trailing side of the sipe. Disposing the chamfered portions as described above makes it possible to improve the uneven wear resistance performance.

In the present technology, a maximum width of the chamfered portion is preferably from 0.8 to 5.0 times a sipe width of the sipe. As described above, by appropriately setting the maximum width of the chamfered portion with respect to the sipe width, it is possible to provide good improvement of the steering stability performance on dry road surfaces and improvement of the steering stability performance on wet road surfaces in a compatible manner. More preferably, the maximum width is from 1.2 to 3.0 times the sipe width.

In the present technology, the chamfered portion preferably extends in parallel with the sipe. Accordingly, it is possible to improve the uneven wear resistance performance and provide good improvement of the steering stability performance on dry road surfaces and improvement of the steering stability performance on wet road surfaces in a compatible manner.

BRIEF DESCRIPTION OF DRAWINGS

FIGS. 7A and 7B are plan views of the respective modified examples.

FIGS. 8A to 8E are plan views of the respective modified examples.

DETAILED DESCRIPTION

The configuration of the present technology is described in detail below with reference to the accompanying drawings. Note that, in FIG. 1, CL is a tire center line.

Figure 1:
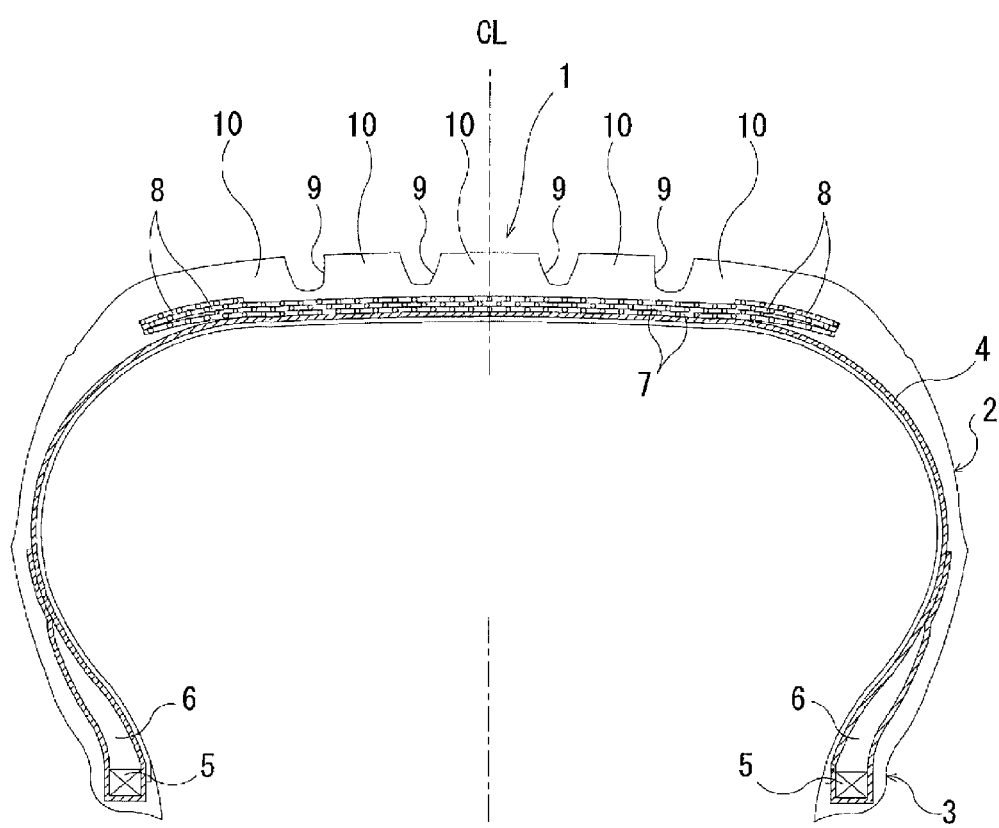
FIG. 1 is a meridian cross-sectional view illustrating a pneumatic tire according to an embodiment of the present technology.

As illustrated in FIG. 1, a pneumatic tire of an embodiment of the present technology includes an annular-shaped tread portion 1 extending in a tire circumferential direction, a pair of sidewall portions 2, 2 disposed on both sides of the tread portion 1, and a pair of bead portions 3, 3 disposed inward of the sidewall portions 2 in a tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of belt layers 7 is embedded on an outer circumferential side of the carcass layer 4 in the tread portion 1. These belt layers 7 include a plurality of reinforcing cords that inclines with respect to the tire circumferential direction and the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define a plurality of ribs 10 in the tread portion 1.

Note that the tire internal structure described above is exemplary in a pneumatic tire, but is not limited thereto.

Figure 2:
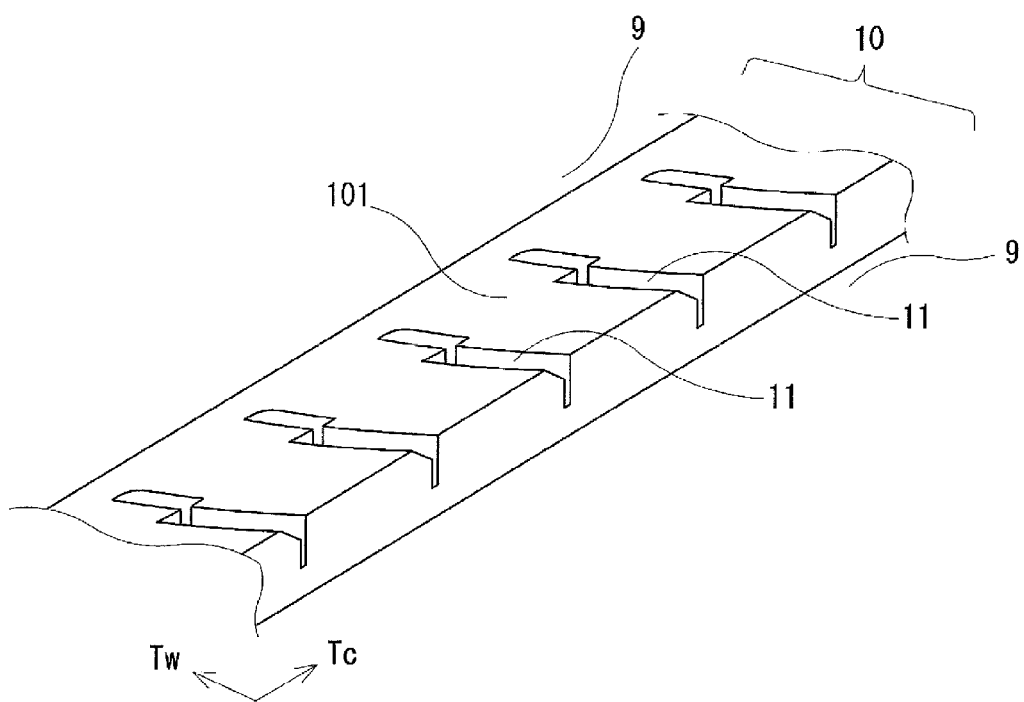
FIG. 2 is a perspective view illustrating part of a tread portion of a pneumatic tire according to the present technology.

FIG. 2 is a perspective view illustrating part of the tread portion 1, Tc indicates the tire circumferential direction and Tw indicates a tire lateral direction as illustrated in FIG. 2. As illustrated in FIG. 2, the rib 10 includes a plurality of sipes 11 extending in the tire lateral direction, and a block 101 defined by the plurality of sipes 11. A plurality of blocks 101 is disposed side by side in the tire circumferential direction. The sipe 11 is a narrow groove having a groove width of not greater than 1.5 mm.

Figure 3:
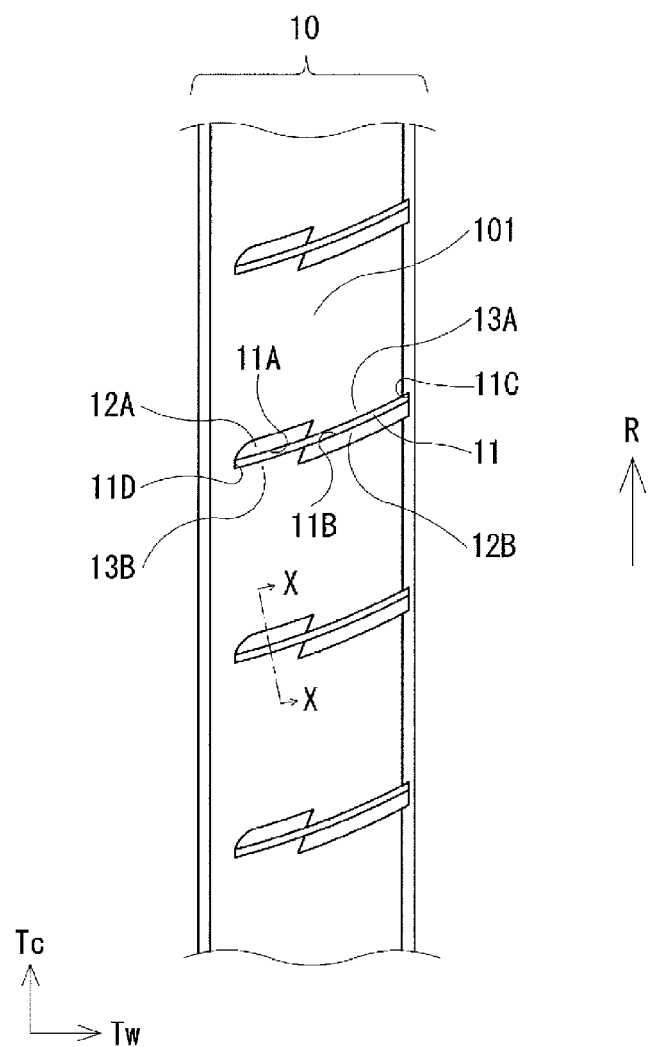
FIG. 3 is a plan view illustrating part of the tread portion of the pneumatic tire according to the present technology.

As illustrated in FIG. 3, the sipe 11 includes end portions 11C and 11D, and is a semi-closed sipe in which only the end portion 11C as one end portion communicates with the main groove 9. That is, the end portion 11C as the one end portion of the sipe 11 communicates with the main groove 9 positioned on one side of the rib 10 and the end portion 11D as the other end portion terminates within the rib 10.

Additionally, the sipes 11 each have a curved shape as the whole shape, and are formed at an interval in the tire circumferential direction within the rib 10. Additionally, the sipe 11 includes an edge 11A as the leading side with respect to a rotation direction R, and an edge 11B as the trailing side with respect to the rotation direction R. Respective chamfered portions 12 are formed on the edge 11A on the leading side and the edge 11B on the trailing side.

The chamfered portions 12 include a chamfered portion 12A as the leading side with respect to the rotation direction R, and a chamfered portion 12B as the trailing side with respect to the rotation direction R. Non-chamfered regions 13 on which no other chamfered portion exists exist on portions opposing to these chamfered portions 12, respectively. That is, there is a non-chamfered region 13B as the trailing side with respect to the rotation direction R on a portion opposing to the chamfered portion 12A and there is a non-chamfered region 13A as the leading side with respect to the rotation direction R on a portion opposing to the chamfered portion 12B. The chamfered portion 12 and the non-chamfered region 13 on which no other chamfered portion exists are disposed to be adjacent on the edge 11A on the leading side and the edge 11B on the trailing side of the sipe 11, respectively, as described above.

Figure 4:
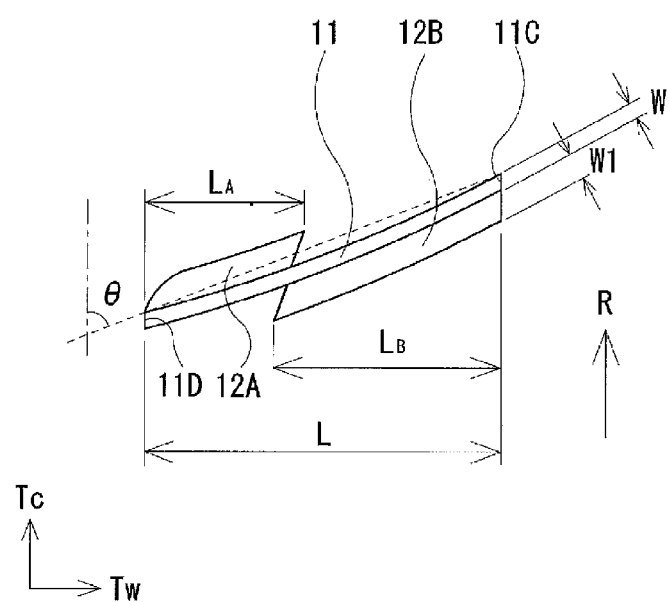
FIG. 4 is a plan view illustrating a sipe formed in the tread portion in FIG. 3 and a chamfered portion thereof.

As illustrated in FIG. 4, in the tire lateral direction, lengths of the sipe 11, the chamfered portions 12A and 12B are a sipe length L, chamfer lengths $L_A$, and $L_B$, respectively. The sipe length L, the chamfer lengths $L_A$ and $L_B$ are lengths in the tire lateral direction from one end portions to the other end portions of the sipe 11, the chamfered portions 12A and 12B, respectively. Both the chamfer lengths $L_A$ and $L_B$ of the respective chamfered portions 12A and 12B are formed so as to be shorter than the sipe length L of the sipe 11.

Figure 5:
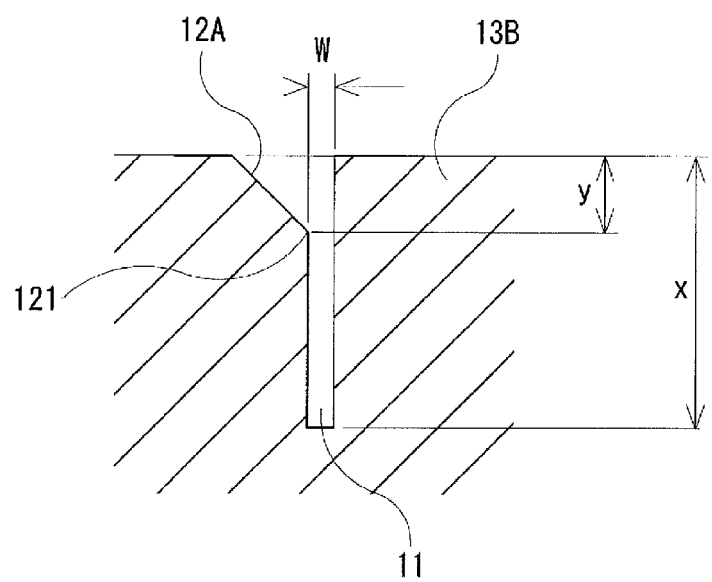
FIG. 5 is a cross-sectional view taken along a line X-X of FIG. 3.

FIG. 5 is a cross-sectional view perpendicular to the sipe 11 and cutting the tread portion 1 off in a vertical direction. As illustrated in FIG. 5, when a maximum depth of the sipe 11 is x (mm) and a maximum depth of the chamfered portion 12 is y (mm), the sipe 11 and the chamfered portion 12 are formed such that the maximum depth x (mm) and the maximum depth y (mm) satisfy a relationship of the following Formula (1). The maximum depth x of the sipe 11 is preferably from 3 mm to 8 mm. In a range from an end portion 121 positioned inside the chamfered portion 12 in the tire radial direction to a groove bottom of the sipe 11, a sipe width W of the sipe 11 is substantially constant. This sipe width W, for example, in a case that a protrusion exists on a groove wall of the sipe 11, does not include a height of the protrusion, or in a case that the sipe width of the sipe 11 gradually narrows while proceeding toward the groove bottom, does not include a narrow portion, and thus is a substantially measured width of the sipe 11.

$$x \times 0.1 \leq y \leq x \times 0.3 + 1.0 \quad (1)$$

In the above-described pneumatic tire, by providing the respective chamfered portions 12 shorter than the sipe length L of the sipe 11 on the edge 11A on the leading side and the edge 11B on the trailing side of the sipe 11, and providing the respective non-chamfered regions 13 on which no other chamfered portion exists on the portions opposing to chamfered portions 12 in the sipe 11, it is possible to enhance the drainage effect based on the chamfered portion 12, and at the same time, to effectively remove a water film on the non-chamfered region 13 on which the chamfered portion 12 is not provided by the edge effect. Accordingly, it is possible to improve steering stability performance on wet road surfaces significantly. Additionally, since the chamfered portion 12 and the non-chamfered region 13 on which no chamfered portion exists are provided on the edge 11A on the leading side and the edge 11B on the trailing side, respectively, in a mixed manner, it is possible to maximally enjoy an effect of enhancing the above-described wet performance during braking and driving. Additionally, since one end portion 11C of the sipe 11 opens into the main groove 9 and the other end portion 11D terminates within the rib 10, reduction effect for noise generated during driving is exhibited, and it is possible to provide good improvement of the steering stability performance on dry road surfaces and improvement of the steering stability performance on wet road surfaces in a compatible manner at the same time.

Additionally, in the above-described pneumatic tire, the maximum depth x (mm) and the maximum depth y (mm) need to satisfy the above-described relationship of Formula (1). By providing the sipe 11 and the chamfered portions 12 so as to satisfy the above-described relationship of Formula (1), an area to be chamfered may be minimized in comparison with a sipe chamfered as in the related art, thus it is possible to improve the steering stability performance on dry road surfaces. As a result, it is possible to provide good improvement of the steering stability performance on wet road surfaces and improvement of the steering stability performance on dry road surfaces in a compatible manner. Here, in a case of $y<x \times 0.1$, the drainage effect based on the chamfered portion 12 becomes insufficient, and conversely in a case of $y>x \times 0.3+1.0$, the steering stability performance on dry road surfaces lowers due to decrease in rigidity of the rib 10. Especially, a relationship of $y \leq x \times 0.3+0.5$ is preferably satisfied.

Figure 6:
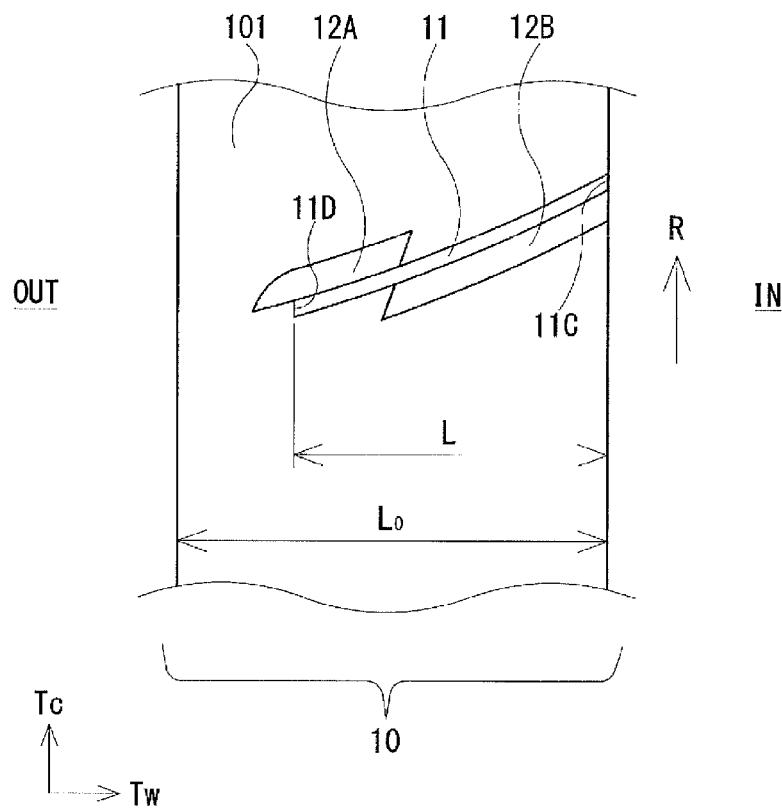
FIG. 6 is a plan view illustrating a modified example of the sipe formed in the tread portion and the chamfered portion thereof of the present technology.

FIG. 6 is a plan view illustrating a modified example of the sipe 11 formed in the tread portion 1 and the chamfered portions 12A and 12B thereof, IN denotes a vehicle inner side, and OUT denotes a vehicle outer side. As illustrated in FIG. 6, the chamfered portion 12A is formed so as to protrude from the end portion 11D of the sipe 11, and extending in a length direction of the sipe 11. That is, the chamfered portion 12A extends as a decorative groove also in a region in which the sipe 11 does not exist. Disposing the chamfered portion 12A as described above makes it possible to provide good improvement of rigidity of the block 101 and enhancement of drainage properties in a compatible manner.

Additionally, a mounting direction with respect to a vehicle is designated for the pneumatic tire illustrated in FIG. 6. In the pneumatic tire for which the mounting direction with respect to the vehicle is designated, the sipe 11 opens toward the vehicle inner side. That is, the end portion 11C of the sipe 11 communicates with the main groove 9 positioned on the vehicle inner side of the rib 10. Since the sipe 11 is disposed as described above, it is possible to reduce sound radiated toward outside the vehicle, and as a result, further improve noise performance.

The rib 10 has a constant width in the tire lateral direction as illustrated in FIG. 6, and a width of the rib 10 is a rib width $L_0$. At this time, the sipe length L of the sipe 11 is preferably from 0.2 to 0.9 times the rib width $L_0$ of the rib 10, and more preferably from 0.3 to 0.8 times $L_0$. As described above, since the sipe length L of the sipe 11 is set to an appropriate length, it is possible to improve the noise performance and provide good improvement of the steering stability performance on dry road surfaces and improvement of the steering stability performance on wet road surfaces in a compatible manner. Here, when the sipe length L of the sipe 11 is smaller than 0.2 times the rib width $L_0$ of the rib 10, a turning-back effect in a chamfer direction may not be obtained, on the other hand, when L is greater than 0.9 times $L_0$, distances between the groove wall of the main groove 9 and the respective edges 11A and 11B of the sipe 11 become shorter, thereby causing a crack during a time of vulcanization, usage, or the like, in some cases.

The sipe 11 is formed, as illustrated in FIG. 4, so as to have an inclination angle θ with respect to the tire circumferential direction. The inclination angle θ refers to an angle formed by an imaginary line connecting both end portions of the sipe 11 (a dotted line illustrated in FIG. 4) and a side surface of the block 101. As the inclination angle θ, an inclination angle on the acute angle side and an inclination angle on the obtuse angle side exist, and FIG. 4 illustrates the inclination angle θ on the acute angle side. Additionally, the inclination angle θ is an inclination angle of the sipe 11 at an intermediate pitch of the rib 10. At this time, the inclination angle θ on the acute angle side is preferably from 40° to 80°, more preferably from 50° to 70°. As described above, by making the sipe 11 inclined with respect to the tire circumferential direction, it is possible to improve the pattern rigidity and further improve the steering stability performance on dry road surfaces. Here, when the inclination angle θ is smaller than 40°, the uneven wear resistance performance deteriorates, and when the angle is greater than 80°, the pattern rigidity may not be sufficiently improved.

In the present technology, a side having the inclination angle θ on the acute angle side of the sipe 11 is an acute angle side, and a side having the inclination angle θ on the obtuse angle side of the sipe 11 is an obtuse angle side. The chamfered portions 12A and 12B formed on the edges 11A and 11B of the sipe 11, respectively, are formed on the acute angle side of the sipe 11. In this way, since the acute angle sides of the sipe 11 are chamfered, it is possible to further enhance the uneven wear resistance performance. Alternatively, the chamfered portions 12A and 12B may be formed on the obtuse angle sides of the sipe 11. Since the chamfered portions 12A and 12B are formed on the obtuse angle sides of the sipe 11, as described above, the edge effect increases, thereby further improving the steering stability performance on wet road surfaces.

In the present technology, although the curve as the whole shape of the above-described sipe 11 makes it possible to improve the steering stability performance on wet road surfaces, additionally, part of the sipe 11 may have a curving or bending shape in a plan view. By forming the sipe 11 as described above, total amounts of the edges 11A and 11B of the respective sipes 11 increase, thereby making it possible to improve the steering stability performance on wet road surfaces.

An end portion of the chamfered portion 12A, positioned closer to the main grooves 9, terminates within the rib 10, as illustrated in FIGS. 2 and 3. Since the chamfered portion 12A terminates as described above, it is possible to further improve the steering stability performance on dry road surfaces, and additionally, the respective end portions of the chamfered portions 12A and 12B, positioned closer to the main grooves 9, may terminate within the rib 10. Additionally, in the present technology, since the end portion of the above-described chamfered portion 12B, positioned closer to the main groove 9, communicates with the main groove 9 adjacent to the rib 10, it is possible to improve the steering stability performance on wet road surfaces, and additionally, the respective end portions of the chamfered portions 12A and 12B, positioned closer to the main grooves 9, may communicate with the main grooves 9. Since the chamfered portions 12A and 12B open into the main grooves 9 as described above, it is possible to further improve the steering stability performance on wet road surfaces.

Figure 7A:
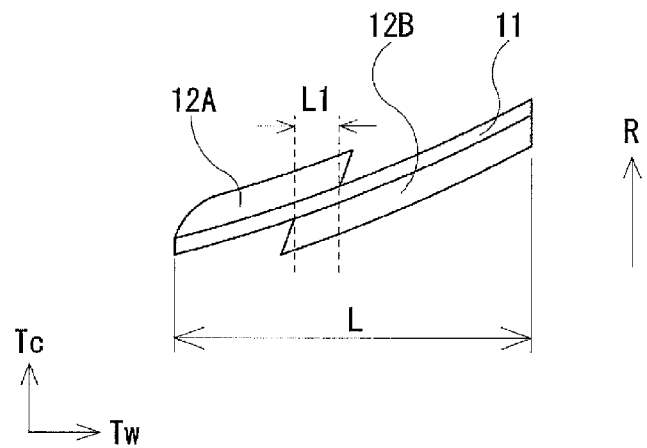
FIGS. 7A and 7B illustrate other modified examples of the sipe and the chamfered portion thereof of the pneumatic tire according to the present technology.
Figure 7B:
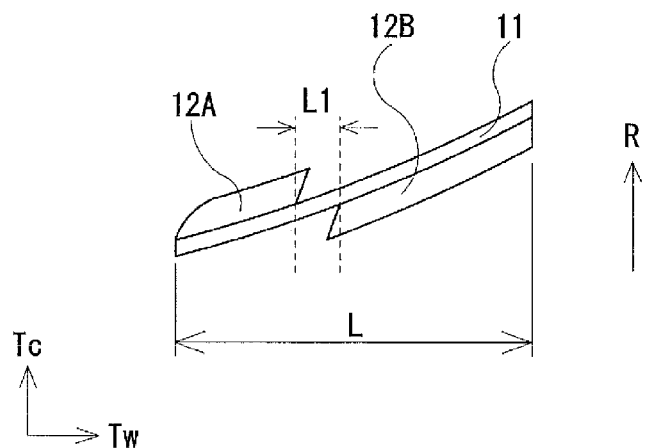

As illustrated in FIG. 7A, the chamfered portion 12A and the chamfered portion 12B are formed such that both parts of the respective chamfered portions 12A and 12B overlap at a central portion of the sipe 11. Here, a length in the tire lateral direction of an overlapping portion as a portion on which the chamfered portion 12A and the chamfered portion 12B overlap is an overlap length L1. On the other hand, as illustrated in FIG. 7B, when no parts of the chamfered portion 12A and the chamfered portion 12B overlap and the chamfered portions 12A and 12B are distanced at constant intervals, a percentage of the overlap length L1 with respect to the sipe length L is denoted by a negative value. The overlap length L1 of the overlapping portion is preferably from −30% to 30% of the sipe length L, more preferably from −15% to 15% of L. As described above, by appropriately setting the overlap length L1 of the chamfered portions 12A and 12B with respect to the sipe length L, it is possible to provide good improvement of the steering stability performance on dry road surfaces and improvement of the steering stability performance on wet road surfaces in a compatible manner. Here, when the overlap length L1 is greater than 30% of L, the steering stability performance on dry road surfaces is insufficiently improved, and when L1 is smaller than −30% of L, the steering stability performance on wet road surfaces is insufficiently improved.

As illustrated in FIG. 3, the chamfered portions 12 are respectively disposed on a position of the edge 11A on the leading side of the sipe 11 and on a position of the edge 11B on the trailing side of the sipe 11. Disposing the chamfered portions 12 as described above makes it possible to improve the uneven wear resistance performance. Here, when the chamfered portions 12 are respectively disposed on more than one positions of the edge 11A on the leading side of the sipe 11 and on more than one positions of the edge 11B on the trailing side of the sipe 11, the number of sections increases, thus the uneven wear resistance performance tends to deteriorate.

Additionally, a maximum value of a width of the chamfered portion 12 measured along a direction orthogonal to the sipe 11 is a width W1. At this time, the maximum width W1 of the chamfered portion 12 is preferably from 0.8 to 5.0 times the sipe width W of the sipe 11, more preferably from 1.2 to 3.0 times W. As described above, by appropriately setting the maximum width W1 of the chamfered portion 12 with respect to the sipe width W, it is possible to provide good improvement of the steering stability performance on dry road surfaces and improvement of the steering stability performance on wet road surfaces in a compatible manner. Here, when the maximum width W1 of the chamfered portion 12 is smaller than 0.8 times the sipe width W of the sipe 11, the steering stability performance on wet road surfaces is insufficiently improved, and when W1 is greater than 5.0 times W, the steering stability performance on dry road surfaces is insufficiently improved.

Additionally, an outer edge portion in a longitudinal direction of the chamfered portion 12 is formed in parallel with an extension direction of the sipe 11. Since the chamfered portion 12 extends in parallel with the sipe 11 as described above, it is possible to improve the uneven wear resistance performance and provide good improvement of the steering stability performance on dry road surfaces and improvement of the steering stability performance on wet road surfaces in a compatible manner.

Figure 8A:
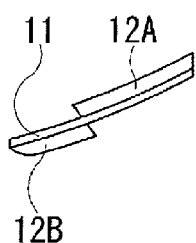
FIGS. 8A to 8E illustrate more other modified examples of the sipe and the chamfered portion thereof of the pneumatic tire according to the present technology.
Figure 8B:
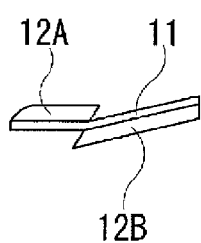
Figure 8C:
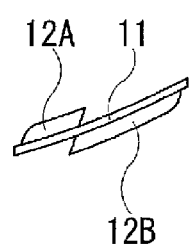
Figure 8D:
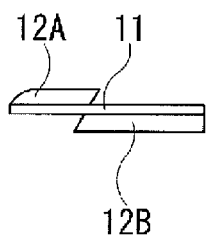
Figure 8E:
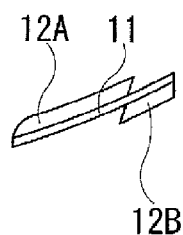

As the chamfered portions 12A and 12B of the sipe 11, besides examples illustrated in FIG. 2 to FIG. 4, FIGS. 7A and 7B, a case in which the obtuse angle sides of the sipe 11 are chamfered as illustrated in FIG. 8A, a case in which part of the sipe 11 bends as illustrated in FIG. 8B, and a case in which end portions of the respective chamfered portions 12A and 12B positioned closer to the main grooves 9 terminate within the rib 10 without opening into the main grooves 9 as illustrated in FIG. 8C may be illustrated. Additionally, a case in which the sipe 11 and the chamfered portions 12A and 12B are formed in parallel with the tire lateral direction as illustrated in FIG. 8D, and a case in which a boundary line in the tire lateral direction between the chamfered portion 12A and the chamfered portion 12B is significantly shifted from a center of the sipe 11 as illustrated in FIG. 8E may be illustrated.

EXAMPLES

With reference to a pneumatic tire that has a tire size of 245/40R19, includes a plurality of main grooves extending in a tire circumferential direction in a tread portion, and sipes extending in a tire lateral direction on a rib defined by the main grooves, tires in Conventional Examples 1 and 2, Comparative Examples 1 and 2, and Examples 1 to 13 were manufactured with the following settings in Table 1 and Table 2: the disposition of chamfers (both sides or one side), structure of sipe (communicating or not communicating), comparison of sipe length L and chamfer lengths $L_A$ and $L_B$, presence or absence of chamfer of portion opposing to chamfered portion, maximum depth x of sipe (mm), maximum depth y of chamfered portion (mm), inclination angle on acute angle side with respect to tire circumferential direction of sipe, chamfered position of sipe (acute angle side or obtuse angle side), shape of entire sipe (straight lines or curved), presence or absence of opening into main groove of chamfered portion, percentage of overlap length L1 of chamfered portion with respect to sipe length L, number of chamfered positions (one or two), maximum width W1 of chamfered portion with respect to sipe width W (W1/W), shape of chamfer (parallel or non-parallel), opening direction of sipe (inner side or outer side), and sipe length L with respect to rib width $L_0$ ($L/L_0$).

With reference to these test tires, sensory evaluation for the steering stability performance on dry road surfaces and the steering stability performance on wet road surfaces by a test driver, visual evaluation for the uneven wear resistance performance, and sensory evaluation for the noise performance were performed, and results were shown altogether in Table 1 and Table 2.

In Table 1 and Table 2, a structure of sipe is referred to as "communicating" when both of the end portions of the sipes communicate with the respective main grooves positioned on both sides of the rib, and is referred to as "not communicating" when one end portion of both the end portions of the sipe does not communicate with the main groove and terminates within the rib. In the respective tires in Conventional Example 1, Comparative Examples 1 and 2, and Examples 1 to 13, in a range from an end portion positioned inside the chamfered portion in the tire radial direction to the groove bottom of the sipe, the sipe width is constant.

The sensory evaluation for the steering stability performance on dry road surfaces and the steering stability performance on wet road surfaces was performed with each of the test tires assembled on wheels having a rim size of 19×8.5 J, and mounted on a vehicle, and under an air pressure condition of 260 kPa. Evaluation results were expressed as index values, Conventional Example 1 being assigned an index value of 100. Larger index values indicate excellent steering stability performance on dry road surfaces and excellent steering stability performance on wet road surfaces.

The visual evaluation for the uneven wear resistance performance was performed by visually evaluating appearance of the test tires after driving 4000 km with each of the test tires assembled on wheels having a rim size of 19×8.5 J, and mounted on a vehicle, and under an air pressure condition of 260 kPa. Evaluation results were expressed as index values, Conventional Example 1 being assigned an index value of 100. Larger index values indicate excellent uneven wear resistance performance.

The sensory evaluation for the noise performance was performed with each of the test tires assembled on wheels having a rim size of 19×8.5 J, and mounted on a vehicle, and under an air pressure condition of 260 kPa. Evaluation results were expressed as index values, Conventional Example 1 being assigned an index value of 100. Larger index values indicate excellent noise performance.

TABLE 1

|  | Conventional Example 1 | Conventional Example 2 | Comparative Example 1 | Comparative Example 2 | Example 1 |
|---|---|---|---|---|---|
| Disposition of chamfers (both sides or one side) | Both sides | One side | Both sides | Both sides | Both sides |
| Structure of sipe (communicating or not communicating) | Communicating | Communicating | Not communicating | Not communicating | Not communicating |
| Comparison of sipe length L and chamfer lengths $L_A$ and $L_B$ | $L = L_A, L_B$ | $L = L_A$ | $L > L_A, L_B$ | $L > L_A, L_B$ | $L > L_A, L_B$ |
| Presence or absence of chamfer of portion opposing to chamfered portion | Presence | Absence | Absence | Absence | Absence |

TABLE 1-continued

| | | | | | |
|---|---|---|---|---|---|
| Maximum depth x of sipe (mm) | 5 mm | 5 mm | 5 mm | 5 mm | 5 mm |
| Maximum depth y of chamfered portion (mm) | 2 mm | 5 mm | 0.3 mm | 3 mm | 2 mm |
| Inclination angle on acute angle side with respect to tire circumferential direction of sipe | 90° | 90° | 90° | 90° | 90° |
| Chamfered position of sipe (acute angle side or obtuse angle side) | Obtuse angle side | Obtuse angle side | Obtuse angle side | Obtuse angle side | Obtuse angle side |
| Shape of entire sipe (straight lines or curved) | Straight lines | Straight lines | Straight lines | Straight lines | Straight lines |
| Presence or absence of opening into main groove of chamfered portion | Presence | Presence | Presence | Presence | Presence |
| Percentage of overlap length L1 of chamfered portion with respect to sipe length L | — | — | 0% | 0% | 0% |
| Number of chamfered positions (one or two) | 1 | 1 | 1 | 1 | 1 |
| Maximum width W1 of chamfered portion with respect to sipe width W (W1/W) | 0.5 | 0.5 | 0.5 | 0.5 | 0.5 |
| Shape of chamfer (parallel or non-parallel) | Parallel | Parallel | Parallel | Parallel | Parallel |
| Opening direction of sipe (inner side or outer side) | Inner side | Inner side | Inner side | Inner side | Inner side |
| Sipe length L with respect to rib width $L_0$ ($L/L_0$) | 0.2 | 0.2 | 0.2 | 0.2 | 0.2 |
| Steering stability performance on dry road surfaces | 100 | 90 | 106 | 99 | 104 |
| Steering stability performance on wet road surfaces | 100 | 105 | 95 | 101 | 100 |
| Uneven wear resistance performance | 100 | 100 | 102 | 102 | 104 |
| Noise performance | 100 | 100 | 110 | 110 | 110 |

TABLE 1-continued

|  | Example 2 | Example 3 | Example 4 | Example 5 |
|---|---|---|---|---|
| Disposition of chamfers (both sides or one side) | Both sides | Both sides | Both sides | Both sides |
| Structure of sipe (communicating or not communicating) | Not communicating | Not communicating | Not communicating | Not communicating |
| Comparison of sipe length L and chamfer lengths $L_A$ and $L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |
| Inclination angle on acute angle side with respect to tire circumferential direction of sipe | 85° | 60° | 60° | 60° |
| Chamfered position of sipe (acute angle side or obtuse angle side) | Obtuse angle side | Obtuse angle side | Acute angle side | Acute angle side |
| Shape of entire sipe (straight lines or curved) | Straight lines | Straight lines | Straight lines | Curved |
| Presence or absence of opening into main groove of chamfered portion | Presence | Presence | Presence | Presence |
| Percentage of overlap length L1 of chamfered portion with respect to sipe length L | 0% | 0% | 0% | 0% |
| Number of chamfered positions (one or two) | 1 | 1 | 1 | 1 |
| Maximum width W1 of chamfered portion with respect to sipe width W (W1/W) | 0.5 | 0.5 | 0.5 | 0.5 |
| Shape of chamfer (parallel or non-parallel) | Parallel | Parallel | Parallel | Parallel |
| Opening direction of sipe (inner side or outer side) | Inner side | Inner side | Inner side | Inner side |
| Sipe length L with respect to rib width $L_0$ ($L/L_0$) | 0.2 | 0.2 | 0.2 | 0.2 |
| Steering stability performance on dry road surfaces | 105 | 106 | 106 | 106 |
| Steering stability performance on wet road surfaces | 100 | 100 | 99 | 102 |
| Uneven wear resistance performance | 104 | 104 | 107 | 107 |
| Noise performance | 110 | 110 | 110 | 110 |

TABLE 2

|  | Example 6 | Example 7 | Example 8 | Example 9 |
|---|---|---|---|---|
| Disposition of chamfers (both sides or one side) | Both sides | Both sides | Both sides | Both sides |
| Structure of sipe (communicating or not communicating) | Not communicating | Not communicating | Not communicating | Not communicating |
| Comparison of sipe length L and chamfer lengths $L_A$ and $L_B$ | $L > L_A, L_B$ | $L > L_A, L_B$ | $L > L_A, L_B$ | $L > L_A, L_B$ |

TABLE 2-continued

|  |  |  |  |  |
|---|---|---|---|---|
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |
| Inclination angle on acute angle side with respect to tire circumferential direction of sipe | 60° | 60° | 60° | 60° |
| Chamfered position of sipe (acute angle side or obtuse angle side) | Acute angle side | Acute angle side | Acute angle side | Acute angle side |
| Shape of entire sipe (straight lines or curved) | Curved | Curved | Curved | Curved |
| Presence or absence of opening into main groove of chamfered portion | Absence | Presence | Presence | Presence |
| Percentage of overlap length L1 of chamfered portion with respect to sipe length L | 0% | 10% | −10% | 0% |
| Number of chamfered positions (one or two) | 1 | 1 | 1 | 2 |
| Maximum width W1 of chamfered portion with respect to sipe width W (W1/W) | 0.5 | 0.5 | 0.5 | 0.5 |
| Shape of chamfer (parallel or non-parallel) | Parallel | Parallel | Parallel | Parallel |
| Opening direction of sipe (inner side or outer side) | Inner side | Inner side | Inner side | Inner side |
| Sipe length L with respect to rib width $L_0$ ($L/L_0$) | 0.2 | 0.2 | 0.2 | 0.2 |
| Steering stability performance on dry road surfaces | 107 | 106 | 108 | 107 |
| Steering stability performance on wet road surfaces | 101 | 102 | 100 | 101 |
| Uneven wear resistance performance | 107 | 107 | 107 | 105 |
| Noise performance | 110 | 110 | 110 | 110 |

|  | Example 10 | Example 11 | Example 12 | Example 13 |
|---|---|---|---|---|
| Disposition of chamfers (both sides or one side) | Both sides | Both sides | Both sides | Both sides |
| Structure of sipe (communicating or not communicating) | Not communicating | Not communicating | Not communicating | Not communicating |
| Comparison of sipe length L and chamfer lengths $L_A$ and $L_B$ | $L > L_A, L_B$ | $L > L_A, L_B$ | $L > L_A, L_B$ | $L > L_A, L_B$ |
| Presence or absence of chamfer of portion opposing to chamfered portion | Absence | Absence | Absence | Absence |
| Maximum depth x of sipe (mm) | 5 mm | 5 mm | 5 mm | 5 mm |
| Maximum depth y of chamfered portion (mm) | 2 mm | 2 mm | 2 mm | 2 mm |

TABLE 2-continued

|  | | | | |
|---|---|---|---|---|
| Inclination angle on acute angle side with respect to tire circumferential direction of sipe | 60° | 60° | 60° | 60° |
| Chamfered position of sipe (acute angle side or obtuse angle side) | Acute angle side | Acute angle side | Acute angle side | Acute angle side |
| Shape of entire sipe (straight lines or curved) | Curved | Curved | Curved | Curved |
| Presence or absence of opening into main groove of chamfered portion | Presence | Presence | Presence | Presence |
| Percentage of overlap length L1 of chamfered portion with respect to sipe length L | 0% | 0% | 0% | 0% |
| Number of chamfered positions (one or two) | 1 | 1 | 1 | 1 |
| Maximum width W1 of chamfered portion with respect to sipe width W (W1/W) | 2 | 2 | 2 | 2 |
| Shape of chamfer (parallel or non-parallel) | Parallel | Non-parallel | Parallel | Parallel |
| Opening direction of sipe (inner side or outer side) | Inner side | Inner side | Outer side | Inner side |
| Sipe length L with respect to rib width $L_0$ ($L/L_0$) | 0.2 | 0.2 | 0.2 | 0.5 |
| Steering stability performance on dry road surfaces | 108 | 106 | 109 | 108 |
| Steering stability performance on wet road surfaces | 106 | 104 | 105 | 109 |
| Uneven wear resistance performance | 112 | 111 | 112 | 112 |
| Noise performance | 110 | 110 | 100 | 108 |

As understood from Table 1 and Table 2, by devising the shapes of chamfered portions formed on the sipe, the uneven wear resistance performance was enhanced and the steering stability performance on dry road surfaces and the steering stability performance on wet road surfaces were enhanced at the same time for the tires in Examples 1 to 13. Additionally, the noise performance of the tires in Examples 1 to 13 was enhanced at the same time.

On the other hand, in Comparative Example 1, since the maximum depth y of the chamfered portion was set to be very shallow, the effect of enhancing the steering stability performance on wet road surfaces was not obtained. Additionally, in Comparative Example 2, since the maximum depth y of the chamfered portion was set to be very deep, an effect of enhancing the steering stability performance on dry road surfaces was not obtained.

The invention claimed is:

1. A pneumatic tire comprising:
   main grooves extending in a tire circumferential direction in a tread portion, and
   a sipe extending in a tire lateral direction on a rib defined by the main grooves, wherein
   the sipe includes an edge on a leading side and an edge on a trailing side,
   chamfered portions each shorter than a sipe length of the sipe are formed on the sipe, including a leading chamfered portion on the edge on the leading side and a trailing chamfered portion on the edge on the trailing side,
   non-chamfered regions, on which no chamfered portion exists, are provided opposing the chamfered portions on the edges of the sipe, one end of the sipe opens into one of the main grooves and an other end terminates within the rib, a maximum depth x (mm) of the sipe and a maximum depth y (mm) of the chamfered portions satisfy x×0.1≤y≤x×0.3+1.0, and a sipe width of the sipe is constant in a range from a sipe portion positioned inside in a tire radial direction of the chamfered portions to a groove bottom of the sipe;

wherein the leading chamfered portion or the trailing chamfered portion extends further beyond the other end of the sipe away from the one of the main grooves than the other end of the sipe and extends in a length direction of the sipe.

2. The pneumatic tire according to claim 1, wherein a sipe length of the sipe is from 0.2 to 0.9 times a rib width of the rib.

3. The pneumatic tire according to claim 1, wherein the sipe is inclined with respect to a tire circumferential direction.

4. The pneumatic tire according to claim 3, wherein an inclination angle on an acute angle side with respect to a tire circumferential direction of the sipe is from 40° to 80°.

5. The pneumatic tire according to claim 3, wherein the chamfered portions are disposed on an acute angle side of the sipe.

6. The pneumatic tire according to claim 3, wherein the chamfered portions are disposed on an obtuse angle side of the sipe.

7. The pneumatic tire according to claim 1, wherein at least a part of the sipe curves or bends in a plan view.

8. The pneumatic tire according to claim 1, wherein the trailing chamfered portion or the leading chamfered portion opens into the one of the main grooves.

9. The pneumatic tire according to claim 1, wherein the leading chamfered portion or the trailing chamfered portion terminates within the rib.

10. The pneumatic tire according to claim 1, wherein an overlap length of the leading chamfered portion formed on the edge on the leading side of the sipe and the trailing chamfered portion formed on the edge on the trailing side of the sipe is from −30% to 30% of the sipe length.

11. The pneumatic tire according to claim 1, wherein a maximum width of each of the chamfered portions is from 0.8 to 5.0 times a sipe width of the sipe.

12. The pneumatic tire according to claim 1, wherein the chamfered portions extend in parallel with the sipe.

* * * * *